United States Patent [19]
Finestone et al.

[11] Patent Number: 5,518,799
[45] Date of Patent: May 21, 1996

[54] FORAMINATED PAPER-PLASTIC LAMINATE SHEETING

[76] Inventors: Arnold B. Finestone, 51 Indian Dr., Woodcliff Lake, N.J. 07675; Gilbert Bloch, 3349 St. Malo Ct., Palm Beach Gardens, Fla. 33410

[21] Appl. No.: 149,620

[22] Filed: Nov. 9, 1993

Related U.S. Application Data

[60] Continuation-in-part of Ser. No. 57,963, May 4, 1993, which is a division of Ser. No. 818,544, Jan. 9, 1992, Pat. No. 5,244,702.

[51] Int. Cl.⁶ .............................. B23B 31/14; B23B 3/10
[52] U.S. Cl. ................ 428/137; 428/131; 428/311.1; 428/315.5; 428/316.6; 428/317.7; 428/511; 428/537.5; 428/904.4; 428/910; 429/937; 52/309.3; 52/309.14
[58] Field of Search ............................... 428/511, 40, 507, 428/42, 512, 537.5, 315.5, 317.3, 311.1, 131, 137, 316.6, 317.7, 904.4, 910, 937; 2/DIG. 1; 52/309.3, 309.14

[56] References Cited

U.S. PATENT DOCUMENTS

| | | | |
|---|---|---|---|
| 4,096,013 | 6/1978 | Lutzmann et al. | 156/272 |
| 4,254,173 | 3/1981 | Peer, Jr. | 428/204 |
| 4,657,610 | 4/1987 | Komatsu et al. | 428/137 X |
| 4,867,150 | 9/1989 | Gilbert | 428/286 X |
| 5,244,702 | 9/1993 | Finestone et al. | 428/34.3 |
| 5,374,477 | 12/1994 | Lawless et al. | 428/317.3 |

*Primary Examiner*—Marion E. McCamish
*Assistant Examiner*—Blaine R. Copenheaver
*Attorney, Agent, or Firm*—Michael Ebert

[57] ABSTRACT

A high-strength, breathable paper-plastic laminate sheeting useable as a protective barrier in the structures of homes and buildings, as well as for other applications in which use has heretofore been made of synthetic fiber, non-woven fabric sheeting. The laminate sheeting is composed of a paper ply cold-laminated by a water-based adhesive to a reinforcing ply formed by an oriented synthetic plastic film, such as polypropylene, that imparts exceptional tear and burst strength to the laminate sheeting, at least one surface of the film being corona-discharge treated to render it wettable and receptive to adhesives. The sheeting is foraminated throughout its entire surface to create a myriad of fine pores that render the sheeting permeable to moisture vapor, but effectively impermeable to liquids. For some applications, an additional paper ply, which may be a metalized paper, is cold-laminated to the other side of the film ply, and/or an additional film ply is cold-laminated to the other side of the paper ply.

11 Claims, 1 Drawing Sheet

FORAMINATED PAPER-PLASTIC LAMINATE SHEETING

RELATED APPLICATIONS

This application is a continuation-in-part of our application Ser. No. 08/057,963, filed May 4, 1993, entitled "Paper-Plastic Laminate Sheeting," this being a division of our application Ser. No. 818,544, filed Jan. 9, 1992, having the same title (now U.S. Pat. No. 5,244,702). The entire disclosure of our copending application is incorporated herein by reference.

BACKGROUND OF INVENTION

1. Field of Invention

This invention relates generally to paper-plastic laminate sheeting of high strength, and more particularly to a laminate sheeting in which a paper ply is cold-laminated to a ply formed of an oriented film of synthetic plastic material, the sheeting being foraminated to render it permeable to moisture vapor, but effectively impermeable to liquid.

2. Status of Prior Art

The sheeting traditionally used in making envelopes, grocery bags and other types of dilatable container products which initially are in a flat state is paper. Paper is a semi-synthetic material made by chemically processing cellulose fibers.

Apart from its low cost, an important advantage of paper is that it can be converted into envelopes and other types of dilatable container products by means of high speed equipment that functions to cut and fold the sheeting into the desired configuration, the folds and flaps of the product being bonded together, where necessary, by standard low-cost adhesives. Another advantage of paper in this context is that it can readily be printed and colored, using standard inks for this purpose.

But such paper products suffer from several disadvantages, for they are characterized by low tear and burst strength, and are by no means water resistant; for unless coated, paper is highly absorbent.

Also well known in the art are plastic-coated cellulosic papers, these being used chiefly in children's books, posters, signs and shipping tags, and for other purposes demanding resistance to hard wear and to outdoor exposure. However, such plastic-coated papers lack high tear and burst strength.

To overcome the drawbacks of paper-fabricated dilatable container products, in recent years such products have been made of TYVEK or other polymeric synthetic plastic sheeting. The resultant products not only have a tear and bursting strength far superior to paper, but they are also waterproof.

However, TYVEK and similar synthetic plastic sheeting is difficult to convert into envelopes and other dilatable container products using high-speed equipment of the type mainly suitable for paper. As a consequence, production scrap rates can run as high as thirty percent, thereby raising the cost of manufacturing these products. Moreover, such plastic sheeting has a low chemical affinity for standard adhesives; hence in the case of envelopes, one must then use a special and more costly adhesive on the flaps. And such plastic sheeting also has a low affinity for standard printing inks, and the products, therefore, dictate special printing inks for this purpose.

Disclosed in our above-identified copending application is a paper-plastic laminate sheeting capable of being converted by conventional equipment into envelopes, grocery bags and other dilatable container products that initially are in a flat state and are normally made of paper. The sheeting is composed of a paper facing sheet cold-laminated by means of a water-based adhesive to a reinforcing film of synthetic plastic material, such as polypropylene. The film is oriented to impart exceptional tear and burst strength characteristics to the resultant waterproof product. The product, whose exterior surface is formed by the paper facing sheet, is readily printable. For some applications, a paper facing sheet is cold-laminated to the other side of the film to produce a three-ply laminate sheeting whose exposed surfaces are readily printable and can accept conventional adhesives.

However, a paper-plastic laminate sheeting of the type disclosed in our copending application is not useable in many applications for which TYVEK sheeting is suitable. TYVEK sheeting is breathable, whereas the laminate sheeting is not, for it is impermeable to moisture vapor as well as to liquids. By the term "breathable," as used herein, is meant a sheeting permeable to gases, such as moisture vapor, but not to water and other liquids.

TYVEK is the trademark of the DuPont Company for a non-woven fabric sheeting formed of polyethylene fibers bonded together by heat and pressure to produce a tough, durable sheet structure having minute pores.

Because of its fine porosity, TYVEK sheeting is useable in homes and buildings where the sheeting is attached or adhered to walls, sheathings, door flanges and windows in order to effect energy savings by significantly retarding air leaks and drafts. The fine porosity of TYVEK renders it breathable, allowing potentially damaging moisture vapor to escape. And because the sheeting is water resistant, TYVEK is useable as a barrier under exterior siding.

However, TYVEK sheeting is relatively expensive, for it takes complex machinery to produce fine polyethylene fibers and to convert these into a non-woven fabric sheeting. Moreover, TYVEK sheeting has a low chemical affinity for standard adhesives, and when it becomes necessary to adhere such sheeting to a wall or other surfaces, special and costly adhesives for the purpose are required.

The following patents are of prior art interest in regard to paper-plastic laminates. The British patent 1,569,447 to Steiner, the U.S. Patent to Peer, and the U.S. Pat. Nos. to Williams 4,041,201, 4,351,877, 4,557,971 and 4,554,193. Also of prior art interest in regard to the corona-discharge treatment of plastics are the U.S. Pat. Nos. to Feldmeier et al. 5,180,599 and to Ohno et al. 4,636,427.

SUMMARY OF INVENTION

In view of the foregoing, the main object of this invention is to provide a breathable paper-plastic laminate sheeting. More specifically, it is an object of this invention to provide a paper-plastic laminate sheeting which is foraminated throughout its entire surface by a myriad of fine pores that render the sheeting permeable only to moisture vapor whereby the sheeting is breathable.

Also an object of the invention is to provide a system for carrying out at high speed a preferred technique for producing a paper film laminate sheeting in accordance with the invention.

Still another object of the invention is to provide a foraminated laminate sheeting of the above type which is stitchable and may be tailored to produce raincoats and other garments which are breathable and thereby comfortable.

Briefly stated, these objects are attained by a high-strength, breathable paper-plastic laminate sheeting useable as a protective barrier in the structures of homes and buildings, as well as for other applications in which use has heretofore been made of synthetic fiber, non-woven fabric sheeting. The laminate sheeting is composed of a paper ply cold-laminated by a water-based adhesive to a reinforcing ply formed by an oriented synthetic plastic film, such as polypropylene, that imparts exceptional tear and burst strength to the laminate sheeting, at least one surface of the film being corona-discharge treated to render it wettable and receptive to adhesives. The sheeting is foraminated throughout its entire surface to create a myriad of fine pores that render the sheeting permeable to moisture vapor, but effectively impermeable to liquids.

BRIEF DESCRIPTION OF DRAWINGS

For a better understanding of the invention, as well as other objects and further features thereof, reference is made to the following detailed description to be read in conjunction with the accompanying drawings, wherein.

DESCRIPTION OF INVENTION

Foraminated Paper-Plastic Laminate Sheeting

Figure 1:
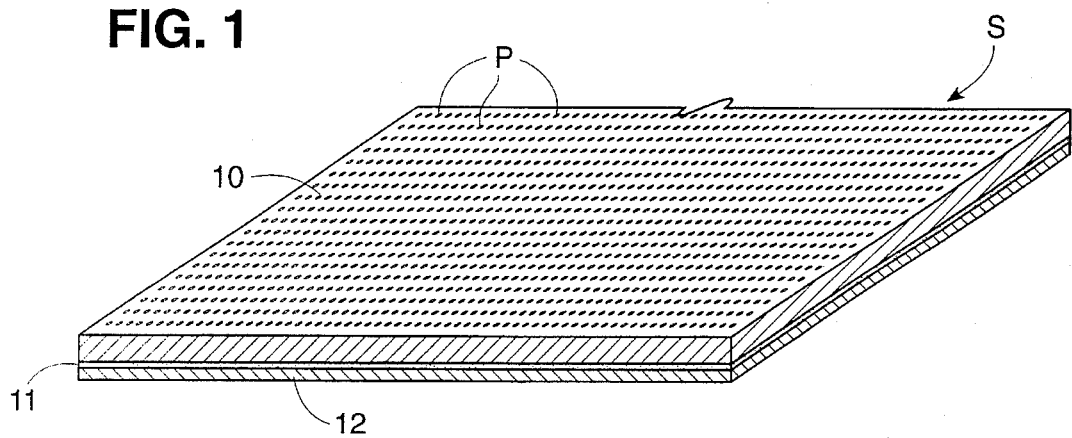
FIG. 1 illustrates a foraminated paper-plastic laminate sheeting in accordance with the invention.

Referring now to FIG. 1, shown therein in an enlarged scale is a flexible paper-plastic sheeting S in accordance with the invention. Sheeting S includes a paper ply 10 whose gauge, weight and quality are appropriate to the end use for which the sheeting is intended.

Cold-laminated by an adhesive layer 11 to the undersurface of paper sheet 10 is a reinforcing ply 12 formed of synthetic plastic material which is uniaxially or biaxially-oriented. Film materials suitable for this purpose are polypropylene, polyethylene, nylon, PVC or a polyester such as MYLAR.

The tensile strength of a synthetic plastic film is substantially increased by orientation which results in molecular orientation of the film material. In the case of biaxial orientation, orientation is in both the longitudinal and transverse directions. This is usually effected by controlled stretching of the unoriented film.

Since paper tends to absorb water in the laminating process, before the paper ply and the film ply are together fed into pressure rolls and subjected to pressure to effect lamination, the inner surface of the film is first coated with the water-based adhesive which does not encounter the inner surface of the paper sheet until these two surfaces meet in the pressure rolls. In this way, the period during which absorption of the adhesive into the interior of the paper sheet can take place is limited.

Cold lamination of the plies is effected at ambient temperature by a water-based adhesive, preferably a polyacrylic copolymer composition having an affinity both for the paper ply and the film ply. Because the water-based adhesive is fluid at ambient temperature and is not a hot melt adhesive, no heat is applied to the biaxially-oriented film as it is being laminated to the paper ply. Also useable as the water-based adhesive is a polyvinyl acetate modified copolymer.

It is important to bear in mind that a biaxially-oriented film is heat-sensitive and that at elevated temperatures, the film relaxes and loses its molecular orientation and tensile strength. It is known, for example, that when two sheets of biaxially-oriented polyester film are seamed together, using an ultrasonically-activated sealing bar for this purpose which creates internal friction and heat within the film, causing the superposed films to soften and fuse, the resultant sealing line is weak, and the sheets then tend to tear along this line. Cold lamination at ambient temperature is, therefore, essential to the present invention in order to produce a laminate sheeting of high tear and burst strength.

It is to be noted that a synthetic plastic film material, such as polypropylene, is normally not receptive to adhesives, especially water-based adhesives. Hence if one were to apply to the surface of this film a water-based adhesive which is flowable at ambient temperature or at a temperature somewhat above ambient but not at the elevated temperature of a hot melt adhesive, this adhesive will not be adsorbed by the film. Essential to the invention is that the opposing surfaces of the film be treated so as to render them wettable and hence receptive to adhesives. To this end, these surfaces are subjected to a corona discharge treatment which enhances their surface energy, as measured in dynes, and thereby renders them wettable to allow for better bonding of adhesives applied thereto.

It is known to subject the surfaces of plastic film to corona discharge treatment and to produce a roll of this treated film which is held in storage for subsequent lamination to another sheet or ply. We have found, however, that pre-treated film has a limited effective life, and that when later laminated, the surfaces of the film are no longer fully active. In producing a paper-film laminate in accordance with the invention, the plastic film, whether or not pre-treated, to render the surfaces wettable, are subjected to corona discharge treatment just prior to lamination, so that the surfaces are then fully active before adhesive is applied thereto.

And to render the laminate sheeting breathable, the sheeting is foraminated to produce a myriad of minute pores P which are uniformly distributed throughout the entire surface of the sheeting. These pores permit moisture vapor and other gases to escape, but are so minute, that liquids cannot pass through the laminate sheeting.

The Laminating System

Figure 2:
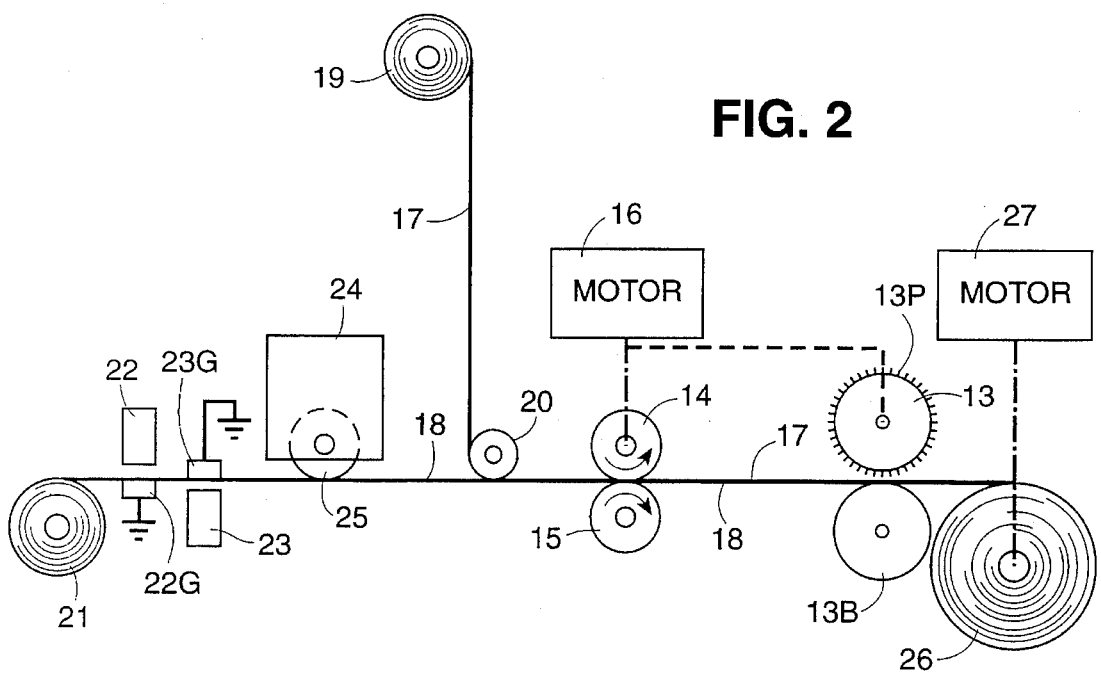
FIG. 2 shows, in schematic form, a system adapted to produce the sheeting.

FIG. 2 schematically illustrates a single-stage system for producing a paper-plastic film laminate sheeting in accordance with the invention. The system includes a combining station having a pair of cooperating pressure rolls 14 and 15 driven at high speed by a motor 16. The nip between these rolls is appropriate to the thickness of the webs to be laminated to provide the desired degree of laminating pressure to ensure secure bonding of the webs.

Fed concurrently into the nip of rolls 14 and 15 at the combining station are a web 17 of Kraft paper for forming the paper ply 10 of the sheeting, and a web 18 of synthetic, plastic film material to form plastic film ply 12. The film which may be of polypropylene, polyethylene, polyester or other suitable material is bi-axially oriented. Web 17 is drawn from a Kraft paper supply reel 19 supported at an elevated position. Paper web 17 is drawn downwardly from this reel and is guided by an idler roll 20 into a horizontal path leading into the nip of the-combining rolls.

Film web 18 is drawn from a film supply reel 21 which is placed at a position to feed film web 18 directly into a horizontal path toward the nip of the combining rolls. Reel 21 is placed well in advance of the combining station in order to expose a fairly long stretch of film web before it enters the combining rolls.

Along this stretch of biaxially-oriented film web 18 having a high dielectric constant, is a first corona discharge electrode 22 which is spaced above the upper surface of the film to create an ionizable air gap therebetween. The film web runs along a ground electrode 22G in vertical alignment with discharge electrode 22. A high-frequency voltage having an amplitude sufficient to produce a corona discharge is applied to electrode 22. The resultant corona discharge which is directed toward the upper surface of the film web, acts to increase the surface energy at the web surface to render it wettable and therefore receptive to adhesives, but it does not affect the molecular orientation of the film.

Also along the stretch following the first discharge station 22–22G is a second corona discharge station for subjecting the undersurface of film web 18 to a corona discharge to render this surface wettable so that it is receptive to an adhesive to be later applied thereto when the sheeting is put to use. The second station consists of a corona discharge electrode 23 which is spaced from the undersurface of web 18 to create an air gap therebetween, and a cooperating ground electrode 23G engaging the upper surface of the web.

Intermediate the second corona discharge station 23–23G and the combining station is an adhesive applicator 24 having a coating roll 25 which engage the now wettable upper surface of film web 18 and applies thereto the water-based, acrylic polymer adhesive for laminating the film web to the paper web to form the laminating adhesive layer 11 of the sheeting.

Thus concurrently entering the nip of pressure rolls 14 and 15 of the combining station at ambient temperature are paper web 17 and the adhesive-coated film web 18. These webs are subjected to pressure by pressure rolls 14 and 15, lamination being effected by this action.

The laminated webs from the combining station are wound on an output reel 26 driven by a motor 27 whose operation is synchronized with motor 16 driving the pressure rolls, for these motors together serve to draw the webs from their supply reels.

Output reel 26 is spaced from combining station 14, 15 so as to provide a long stretch sufficient to permit drying out of the adhesive applied to the webs. A heating station may be provided to accelerate drying the adhesive, but its temperature must be well below the level at which the orientation of the plastic would be affected. In order to foraminate the paper-plastic web of sheeting to produce a myriad of fine pores therein, an embossing roll 13 is provided adjacent the end of the long stretch. Roll 13 is provided with a circumferential array of fine pins 13P which penetrate the laminate sheeting which is backed by a roll 13B of having a covering layer of elastomeric material.

In practice foramination of the laminate sheeting may be carried out in a separate stage of the system so as to be sure that before foramination takes place, the adhesive is no longer sticky.

Thus wound on the output reel 26 is a roll of foraminated paper-plastic laminate sheeting whose exposed plastic film surface is activated so that it can be adhered by a water-based adhesive to a wall or other surface to be protectively covered by the sheeting.

Because the water-based polyacrylic adhesive is absorbed in the paper ply, this ply is rendered water resistant. However, the paper ply is rendered moisture-vapor permeable by the fine pores punctured therein.

Modifications

In practice, an additional oriented film ply can be cold-laminated by a water-based adhesive to the paper ply of the paper-film laminate to provide a non-curling three ply foraminated laminate sheeting of exceptional strength in which the paper ply is sandwiched between the film plies. And the paper ply, whether in a two ply or three ply laminate, may be treated or processed to render it flame resistant.

A foraminated laminate sheeting in accordance with the invention may be embossed, using embossing rolls for this purpose to impart greater body to the laminate and for decorative effects.

When the laminate sheeting is to be used as a weather barrier and its plastic film ply is exposed to solar radiation, the oriented film for the purpose is preferably a biaxially-oriented polyester which is not degraded by ultraviolet radiation. Also the laminate sheeting may incorporate a metalized ply for heat retention.

Thus one can produce a two ply laminate formed by (a) a flame-retardant paper ply and a plastic film ply, (b) by a metalized paper ply and a plastic film ply, or (c) a water-resistant paper ply and a plastic film ply.

And one can produce a three ply laminate formed by (a) a water-resistant paper ply, a plastic ply and a metalized paper ply, or (b) a metalized paper ply, a plastic film ply and a flame-retardant paper ply. A two ply laminate has a tendency to curl which is avoided by an additional ply.

Whether the foraminated sheeting is a two or three ply structure, because its structure has a myriad of fine pores, it is readily stitched and the sheeting, therefore, may be cut and tailored to produce disposable medical gowns and other garments, such as raincoats which are water proof, yet breathable, for the sheeting permits the escape of moisture vapor and the wearer who perspires will be comfortable.

To further enhance the strength of the sheeting, one may interpose between the paper ply and the oriented film ply parallel strands of fiber glass which reinforce the sheeting.

While there has been disclosed preferred embodiments of the invention, it is to be understood that many changes may be made therein without departing from the spirit of the invention.

We claim:

1. A breathable paper-plastic non-stretchable laminate sheeting attached to a wall of a building to form a protective barrier impermeable to liquids to effect energy savings comprising:

A. a paper ply having an inner surface;

B. a reinforcing ply formed of oriented synthetic plastic film having an inner surface that is corona-discharge treated to render it wettable;

C. a water-based adhesive cold laminating the inner surface of the reinforcing ply to the inner surface of the paper ply without degrading the orientation of the film ply to produce a laminate sheeting of high strength, said laminate sheeting being foraminated to create a myriad of fine pores that render the sheeting permeable only to moisture vapor and impermeable to liquids, whereby the sheeting attached to a building wall effects energy saving by reducing air leaks and drafts, yet allows moisture vapor to escape.

2. A laminate sheeting attached to a wall of a building as set forth in claim 1, in which said film is bi-axially oriented.

3. A laminate sheeting attached to a wall of a building as set forth in claim 1, in which the water-based adhesive is a polyacrylate copolymer.

4. A laminate sheeting attached to a wall of a building as set forth in claim 1, in which the water-based adhesive is a polyvinyl acetate modified copolymer.

5. A laminate sheeting attached to a wall of a building as set forth in claim 1, in which the outer surface of the film is corona-discharge treated to render it wettable so that it may be adhered to a wall.

6. A laminate sheeting attached to a wall of a building as set forth in claim 1, in which the film is of a material selected from the class consisting of polypropylene, nylon, polyethylene and polyester.

7. A laminate sheeting attached to a wall of a building as set forth in claim 1, in which the paper ply is treated to render it flame resistant.

8. A laminate sheeting attached to a wall of a building as set forth in claim 1, in which the paper sheet is coated to increase its resistance to water.

9. A laminate sheeting attached to a wall of a building as set forth in claim 1 having an additional paper ply laminated to the outer surface of the film ply to produce a non-curling sheeting.

10. A sheeting attached to a wall of a building as set forth in claim 9, in which the additional paper ply is metalized.

11. A laminate sheeting attached to a wall of a building as set forth in claim 10, having an additional film ply laminated to the outer surface of the paper ply to produce a non-curling sheeting.

* * * * *